US012162122B2

(12) United States Patent
Koch et al.

(10) Patent No.: US 12,162,122 B2
(45) Date of Patent: Dec. 10, 2024

(54) TRACK PROCESSING MACHINE, IN PARTICULAR IMPACT WRENCH MACHINE, AND PROCESS FOR TRACK PROCESSING BY A TRACK PROCESSING MACHINE

(71) Applicant: ROBEL Bahnbaumaschinen GmbH, Freilassing (DE)

(72) Inventors: Bernhard Koch, Anger (DE); Markus Fafian Dieguez, Saaldorf-Surheim (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 510 days.

(21) Appl. No.: 17/391,229

(22) Filed: Aug. 2, 2021

(65) Prior Publication Data

US 2022/0040828 A1 Feb. 10, 2022

Related U.S. Application Data

(63) Continuation of application No. PCT/EP2020/071928, filed on Aug. 4, 2020.

(51) Int. Cl.

| | |
|---|---|
| ***B25B 21/02*** | (2006.01) |
| ***B25F 5/00*** | (2006.01) |
| ***B25F 5/02*** | (2006.01) |
| ***E01B 9/10*** | (2006.01) |
| ***E01B 11/36*** | (2006.01) |
| ***E01B 29/29*** | (2006.01) |

(52) U.S. Cl.

CPC .............. *B25B 21/02* (2013.01); *B25F 5/006* (2013.01); *E01B 29/29* (2013.01); *B25F 5/02* (2013.01); *E01B 9/10* (2013.01); *E01B 11/36* (2013.01)

(58) Field of Classification Search

None

See application file for complete search history.

(56) References Cited

U.S. PATENT DOCUMENTS

| | | | | |
|---|---|---|---|---|
| 2021/0170501 | A1* | 6/2021 | Barezzani | B23B 45/001 |
| 2021/0246615 | A1 | 8/2021 | Gaspard et al. | |
| 2021/0370484 | A1* | 12/2021 | Widlroither | B25B 21/026 |

FOREIGN PATENT DOCUMENTS

| | | | |
|---|---|---|---|
| DE | 102013204225 | A1 | 9/2014 |
| EP | 0203370 | B1 | 7/1989 |
| FR | 2508071 | A1 | 12/1982 |
| JP | S50125196 | U | 10/1975 |
| WO | 2019207424 | A1 | 10/2019 |
| WO | 2019228609 | A1 | 12/2019 |
| WO | 2019243756 | A1 | 12/2019 |

* cited by examiner

*Primary Examiner* — Daniel Jeremy Leeds

(74) *Attorney, Agent, or Firm* — Laurence A. Greenberg; Werner H. Stemer; Ralph E. Locher

(57) ABSTRACT

A track processing machine, in particular an impact wrench machine for track processing, contains at least one handle for manually guiding the track processing machine, a first structural unit with a processing head, which can be driven in rotation for track processing about an axis of rotation, a second structural unit, and a linking unit for mechanically connecting the first structural unit to the second structural unit and for reducing a longitudinal dimension of the track processing machine along the axis of rotation.

16 Claims, 7 Drawing Sheets

TRACK PROCESSING MACHINE, IN PARTICULAR IMPACT WRENCH MACHINE, AND PROCESS FOR TRACK PROCESSING BY A TRACK PROCESSING MACHINE

CROSS-REFERENCE TO RELATED APPLICATION

This application is a continuation, under 35 U.S.C. § 120, of copending international application PCT/EP2020/071928, filed Aug. 4, 2020, which designated the United States; the prior application is herewith incorporated by reference in its entirety.

BACKGROUND OF THE INVENTION

Field of the Invention

The invention relates to a track processing machine, in particular an impact wrench machine for track processing. Furthermore, the invention relates to a process for track processing by means of such a track processing machine.

From international patent disclosure WO 2019/228 609 A1, an impact wrench machine for tightening and loosening track bolt connections is known. In areas of the track where the available processing space is limited, such as in switches or on bridges, such an impact wrench machine is often difficult to handle.

BRIEF SUMMARY OF THE INVENTION

It is therefore an object of the invention to create an improved track processing machine, which is in particular simple and flexible to use.

The object is achieved by a track processing machine for track processing containing at least one handle for manually guiding the track processing machine, a first structural unit with a processing head which is drivable in rotation about an axis of rotation, a second structural unit, and a linking unit for mechanically connecting the first structural unit to the second structural unit and for reducing a longitudinal dimension of the track processing machine along the axis of rotation. Due to the fact that the track processing machine has a linking unit for mechanically connecting a first structural unit to a second structural unit and for reducing a longitudinal dimension of the track processing machine along an axis of rotation of a processing head, the longitudinal dimension can be adapted to the available processing space. For example, a large longitudinal dimension is advantageous for the ease of operation when the axis of rotation is vertically oriented. A small longitudinal dimension may be necessary when the track processing requires a horizontal orientation of the axis of rotation. The installation space occupied by the track processing machine can be flexibly adapted to the available processing space by the linking unit. This means that the track processing machine can also be used in confined areas of the track, such as in switches or on bridges. The range of application of the track processing machine is thus increased and the track processing machine is particularly user-friendly and economical in operation.

The longitudinal dimension of the track processing machine is understood to be the measurement of the track processing machine along the axis of rotation of the processing head. The longitudinal dimension is determined on the processing side starting from the processing head. A processing tool that can be reversibly connected to the processing head is not to be considered for determining the longitudinal dimension of the track processing machine. The advantages associated with the track processing machine are independent of the nature of the processing tool connected to it.

The track processing machine has the at least one handle for manually guiding and/or manually carrying the track processing machine. The track processing machine can be construed to be at least partially, in particular exclusively, guided, in particular carried, by an operator during the track processing. The track processing machine can also have a guiding device for at least partial guiding relative to the track to be processed, in particular on at least one rail of the track. Preferably, the track processing machine contains at least one, in particular at least two, in particular at least three, handles for manually guiding the track processing machine. The at least one handle can be attached to the track processing machine in a rigid and/or removable and/or foldable and/or displaceable manner, in particular to the first structural unit and/or to the second structural unit.

According to one aspect of the invention, at least one handle is a component of the second structural unit, i.e. in particular arranged opposite to the processing side with respect to the linking unit. The increased distance between the handle and the processing head is advantageous for user-friendliness. Preferably, at least one handle is part of the first structural unit. The track processing machine can thus be handled in a particularly user-friendly manner, especially in different processing positions.

The processing head can be construed as a processing tool and/or as a tool connector for receiving a processing tool. In order to connect the processing head to the processing tool in a reversibly releasable manner, the processing head can have, for example, a socket wrench connector and/or a grinding wheel connector and/or a drill chuck. Preferably, the processing head is construed as a linking element of a shaft connection, in particular as a linking element of a toothed shaft connection and/or a tongue-and-groove connection and/or a polygonal connection, in particular a square connection or a hexagonal connection.

The track processing machine can be a grinding machine, a cut-off machine, in particular an abrasive cut-off machine and/or a saw, a drilling machine and/or a milling machine. Preferably, the track processing machine is a screwing machine, in particular an impact screwing machine, for loosening and tightening screw connections. The processing tool may be a grinding tool, a cutting tool, a drilling tool, in particular a tapping tool, a screwing tool and/or a milling tool. The track processing machine can thus be used in a particularly flexible manner.

Preferably, the linking unit is also construed to reduce a transverse dimension of the track processing machine, perpendicular to the axis of rotation. For example, the linking unit can be constructed in such a way that the longitudinal dimension of the track processing machine can be reduced while simultaneously increasing the transverse dimension and/or vice versa.

The linking unit can have a locking means for releasably locking a displacement movement or a displacement position and/or a processing position of the first structural unit relative to the second structural unit. The locking means may be construed to reversibly frictionally lock and/or positively lock the first structural unit with the second structural unit. For example, the locking means may comprise a latch connection and/or a spring bolt. Advantageously, this ensures that the track processing machine can be operated in a particularly safe manner.

The linking unit preferably has two linking elements that are displaceable relative to one another. The first structural unit is preferably attached to the first linking element and the second structural unit to the second linking element. The linking unit may be construed as a linear guide. The linking elements may be two components of the linear guide that are linearly displaceable relative to each other. Such a track processing machine can be manufactured particularly economically and is robust in operation.

Preferably, the track processing machine comprises at least one motor, in particular a fluidic motor, in particular an internal combustion engine and/or a hydraulic motor and/or a pneumatic motor, and/or an electric motor for rotatably driving the processing head. The at least one motor may be a component of the second structural unit. The processing head is preferably rotatably drivable relative to the at least one handle by means of the motor.

According to a further aspect of the invention, the linking unit is construed to allow the displacement of the first structural unit relative to the second structural unit by at least 10%, in particular by at least 25%, and in particular by at least 50% of the longitudinal dimension. Preferably, the linking unit is construed to allow the displacement of the first structural unit relative to the second structural unit by at least 80 mm, in particular by at least 100 mm, in particular by at least 250 mm and/or by a maximum of 500 mm, in particular along the axis of rotation. Preferably, the linking unit is construed to enable the displacement of the first structural unit relative to the second structural unit by at least 25°, in particular by at least 45°, in particular by at least 90°, in particular by at least 120° and/or by a maximum of 270° about a pivot axis.

A track processing machine configured such that the linking unit connects the first structural unit with the second structural unit such that these are displaceable relative to each other between a first processing position and a second processing position. is particularly flexible in use. Preferably, the linking unit is construed in such a way that the first structural unit and the second structural unit are displaceable relative to each other between at least two, in particular at least three, in particular at least four processing positions. The processing positions are characterized in that in these the track processing machine can be used for track processing. Preferably, the track processing machine can be fixed in the first and the second processing position, in particular in each processing position, in particular by means of the locking means. The track processing machine is thus particularly reliable and safe in operation.

A track processing machine configured such that the latter has a first longitudinal dimension along the axis of rotation in a first processing position and a second longitudinal dimension in a second processing position, wherein the second longitudinal dimension is smaller than the first longitudinal dimension by at least 25% is particularly flexible in use. The second longitudinal dimension is preferably smaller than the first longitudinal dimension by at least 25%, in particular by at least 30%, in particular by at least 40%, in particular by at least 50%, in particular by at least 60%, and/or by a maximum of 90%. This allows the track processing machine to be used even in areas of a track where space is very limited.

A track processing machine configured such that the linking unit has a linking joint for pivoting the first structural unit relative to the second structural unit can be manufactured particularly economically, is robust in operation and can be used flexibly. The linking unit may comprise one or more linking joints for pivoting the first structural unit relative to the second structural unit. In particular, the connecting joint serves to change the orientation of the first structural unit and the second structural unit relative to each other. Preferably, the linking unit is construed to pivot the structural units relative to each other between the first processing position and the second processing position. The connecting joint may be construed as a pivot joint, without a pivot stop, or as a swivel joint, with a pivot stop. Preferably, the joint axis or swivel axis is oriented obliquely, in particular perpendicularly, to the axis of rotation. Advantageously, this allows the second structural unit to maintain its orientation even if the axis of rotation is shifted between a vertical and a horizontal orientation for track processing. Preferably, the first structural unit is pivoted relative to the second structural unit between the first processing position and the second processing position by at least 70°, in particular by at least 80°, and in particular by at least 90°. The second longitudinal dimension in the second processing position is preferably at most equal to a longitudinal dimension of the first structural unit. The track processing machine is thus particularly easy and convenient in operation.

A track processing machine configured such that the linking unit is construed for tool-free displacement of the first structural unit relative to the second structural unit is particularly economical and user-friendly in operation. Preferably, the track processing machine is displaceable manually and/or motor-driven by means of a displacement drive. Preferably, the linking unit is construed for tool-free displacement between the first processing position and the second processing position. The locking means can be displaceable manually or motor-driven between a locking position and a release position by means of a locking drive.

A track processing machine comprising an impact wrench for driving the processing head in rotation about the axis of rotation is particularly flexible in use. The impact wrench is preferably a component of the first structural unit. The drive torque can thus be transmitted with particularly low loss and efficiently from the impact wrench to the processing head. The impact wrench is preferably construed for tightening and loosening rail screws.

A track processing machine comprising a drive torque on the processing head about the axis of rotation of at least 150 Nm can be used particularly flexibly for track processing. Preferably, the track processing machine is construed to provide a drive torque on the processing head about the axis of rotation of at least 150 Nm, in particular at least 250 Nm, in particular at least 500 Nm, in particular at least 1000 Nm, and/or a maximum of 2500 Nm, in particular a maximum of 1500 Nm. The drive torque is preferably transmitted from the impact wrench to the processing head. The track processing machine thus makes it possible to actuate, in particular tightly fastened, screw connections on tracks.

A track processing machine configured such that the first structural unit has a motor for rotatably driving the processing head can be manufactured particularly economically, is efficient and robust in operation. The motor is preferably construed to rotationally drive the impact wrench. The first structural unit can thus comprise the entire drive train for rotationally driving the processing head. A relative movement of components of the drive train to each other for displacing the track processing machine between the first processing position and the second processing position is thus avoided. The rotary drive of the processing head can thus be carried out efficiently and with low wear.

A track processing machine comprising an energy storage device for providing a drive power transmitted to the processing head is particularly flexible in use. The energy storage device preferably provides the power for driving the motor. The energy storage device preferably has a capacity of at least 350 Wh, in particular at least 500 Wh, in particular at least 700 Wh, in particular at least 1 kWh, in particular at least 5 kWh, and/or a maximum of 50 kWh. The energy storage device may comprise an electrical energy storage device, a chemical energy storage device and/or a fluid storage device, in particular a fuel tank. The energy storage device is preferably a component of the second structural unit.

A track processing machine configured such that the energy storage device comprises an accumulator is particularly safe and flexible to handle. Preferably, the accumulator is construed as a lithium polymer accumulator. The track processing machine can have an accumulator receptacle for reversibly detachable attachment of the accumulator to the track processing machine. A supply voltage of the accumulator is preferably at least 18 V, in particular at least 36 V, in particular at most 130 V.

The energy storage device, in particular the accumulator, may have a handle for transporting the accumulator and/or for manually guiding the track processing machine.

A track processing machine configured such that the second structural unit comprises the energy storage device has an especially high ease of operation, in particular if it is construed as an impact wrench machine. Since the energy storage device is a component of the second structural unit, it can serve as an inertia damper. The comparatively high mass of the energy storage device dampens oscillation movements, i.e. vibration movements, which are transmitted from the impact wrench to the second structural unit, in particular to the at least one handle. Furthermore, the energy storage device occupies a construction volume which is not negligible. Due to the fact that the energy storage device is a component of the second structural unit, the longitudinal dimension of the track processing machine can be considerably reduced by shifting between the first and the second processing position.

Preferably, the motor is connected to the energy storage device via flexible, in particular electrical, lines. This reliably ensures power transport between the energy storage device and the motor via the linking unit.

A track processing machine comprising a control unit to control a drive power transmitted to the processing head is particularly flexible and easy to handle. The control unit can be construed to control, in particular continuously, the drive power transmitted to the processing head, in particular via the motor. The control unit may comprise an electronic circuit, in particular programmable control electronics, for controlling the drive power. Preferably, the control unit comprises a power component for reversibly switching the motor with the drive power, in particular electrical power, provided by the energy storage device. The control unit is preferably a component of the second structural unit. The vibrations transmitted to the control unit are thus reduced.

A track processing machine configured such that the control unit is construed to detect an arrangement of the track processing machine in at least one processing position is particularly reliable and robust in operation. Preferably, the control unit is construed to reversibly interrupt the operation of the track processing machine when it is not in one of the processing positions and/or when it is not locked in one of the processing positions. For this purpose, the control unit can be in signal connection with a sensor which detects the arrangement of the track processing machine in the at least one processing position and/or the locked state in the at least one processing position. The control unit can be construed to reversibly interrupt the supply of drive power to the processing head, in particular of electrical power to the motor.

A track processing machine comprising a vibration decoupler acting between the processing head and the at least one handle has a high ease of operation and is particularly robust in operation. The vibration decoupler is preferably arranged, in particular along a vibration path, between the processing head and the linking unit, in particular between the motor and the linking unit. The linking unit is thus less intensively loaded by vibrations. The vibration decoupler preferably has at least one damping element, in particular made of a rubber-elastic material. Preferably, the motor is attached to the linking unit by means of the damping elements, in particular using screw bolts. The vibration decoupler is a component of the first structural unit. Alternatively, the vibration decoupler can be a component of the second structural unit.

It is another object of the invention to provide a process for track processing by means of a track processing machine in a simple and flexible manner.

This object is achieved by a process for track processing by means of a track processing machine according to the invention. The advantages of the process correspond to the advantages of the track processing machine described above. Preferably, the process is further developed with at least one of the features which are described above in connection with the track processing machine. Due to the fact that the track processing machine is used to process a track, track processing can be performed both in areas where there is sufficient processing space and in confined areas, such as in switches or on bridges, where there is little space available for track processing. The acquisition, maintenance and operation of different track processing machines can thus be dispensed with. The track processing machine ensures that the track is processed in a particularly economical manner.

Preferably, the track processing machine is designed as an impact wrench machine for tightening and loosening screwed connections, in particular screwed track connections for fastening rails to railroad ties. Track processing machines of this type are usually particularly space-intensive and thus benefit particularly strongly from a reduction in the longitudinal dimension.

Other features which are considered as characteristic for the invention are set forth in the appended claims.

Although the invention is illustrated and described herein as embodied in a track processing machine, in particular an impact wrench machine, and a process for track processing by a track processing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
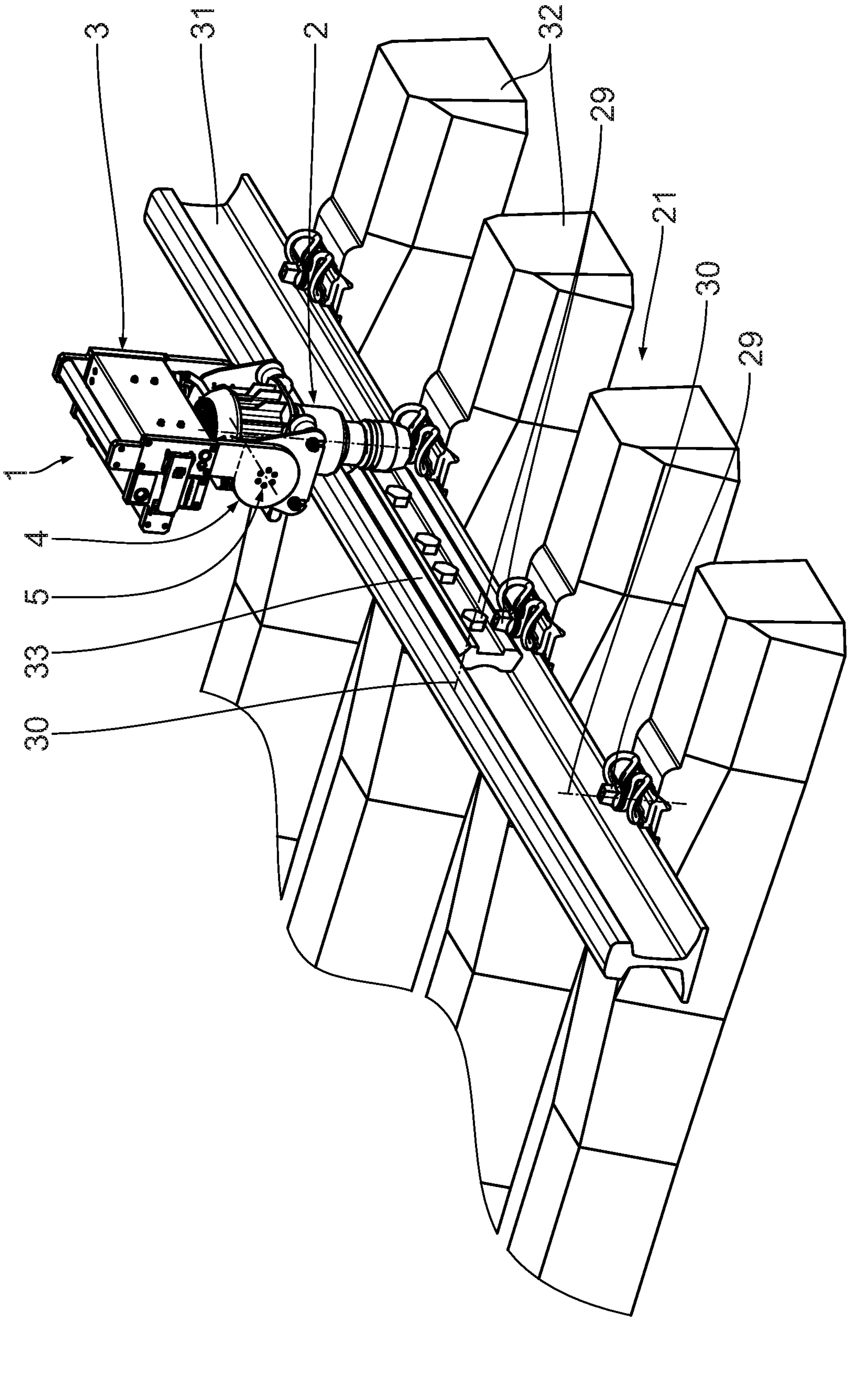
FIG. 1 is a diagrammatic, perspective view of a track processing machine, in particular an impact wrench machine, for track processing, and contains a first structural unit, a second structural unit and a linking unit for mechanically connecting the first structural unit to the second structural unit, wherein the track processing machine is arranged in a first processing position.
Figure 2:
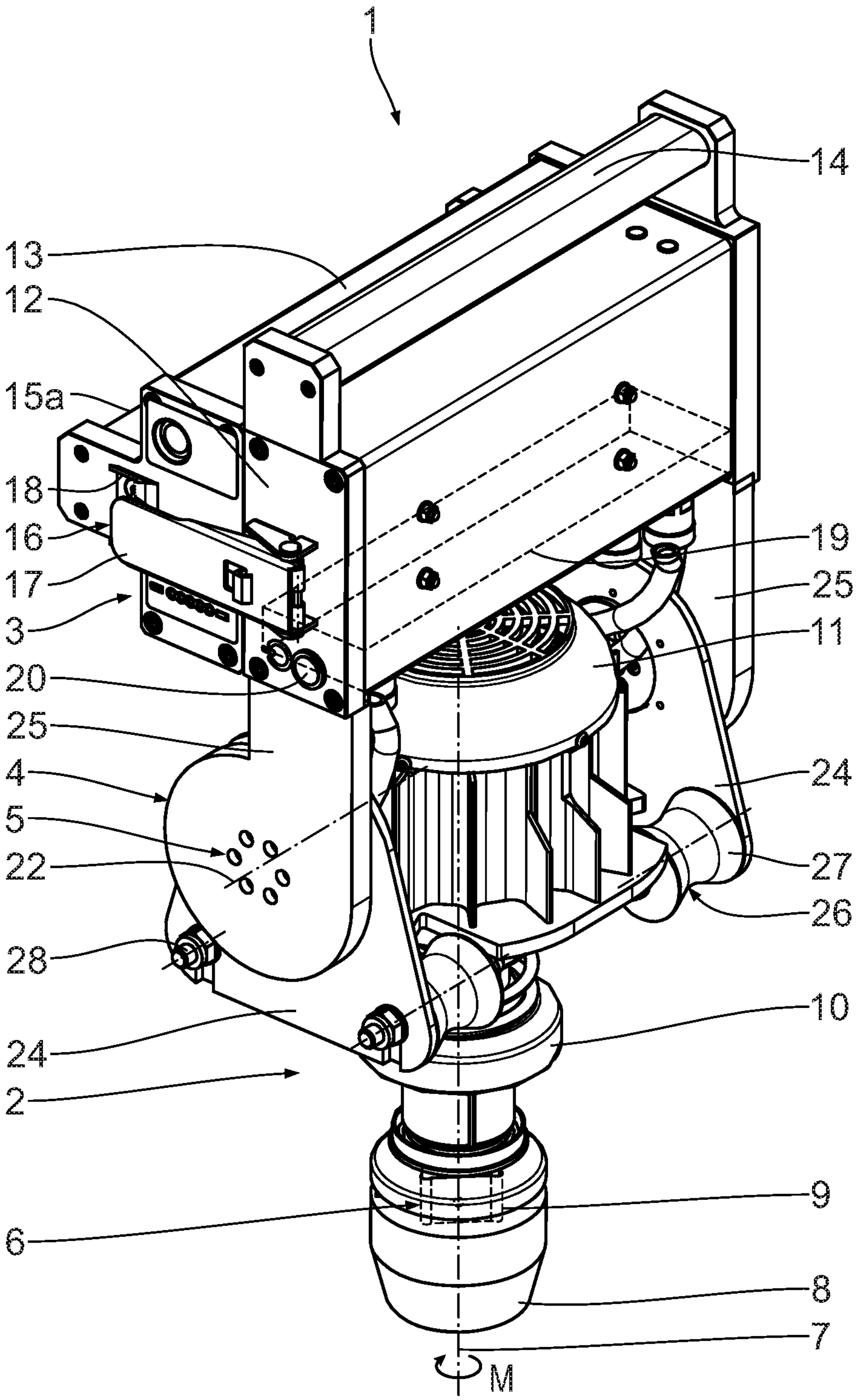
FIG. 2 is an enlarged, perspective view of the track processing machine shown in FIG. 1.
Figure 3:
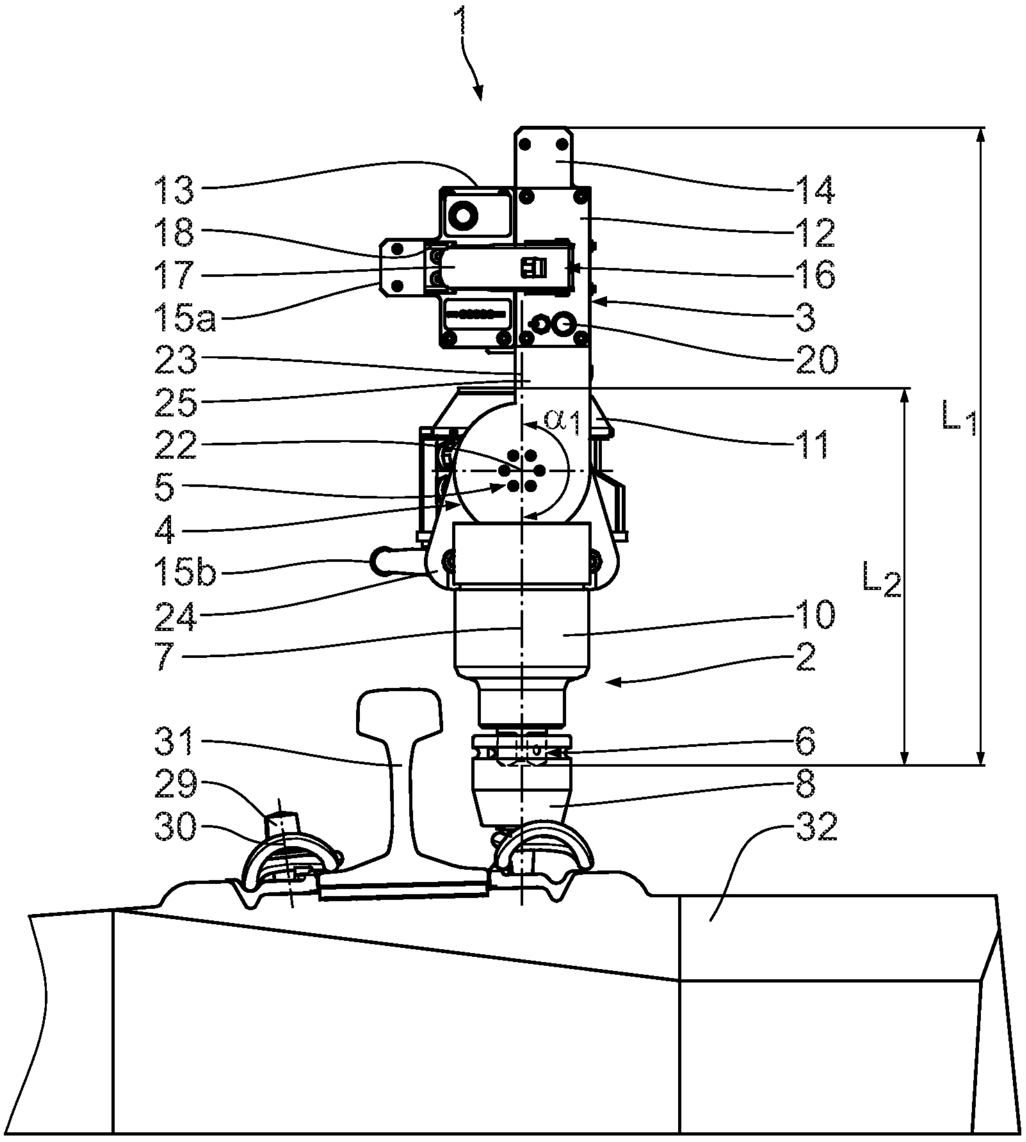
FIG. 3 is a side view of the track processing machine shown in FIG. 1, wherein a socket wrench is attached to a processing head of the first structural unit, and wherein the track processing machine is used to loosen a screw connection with a vertically oriented screw axis.
Figure 4:
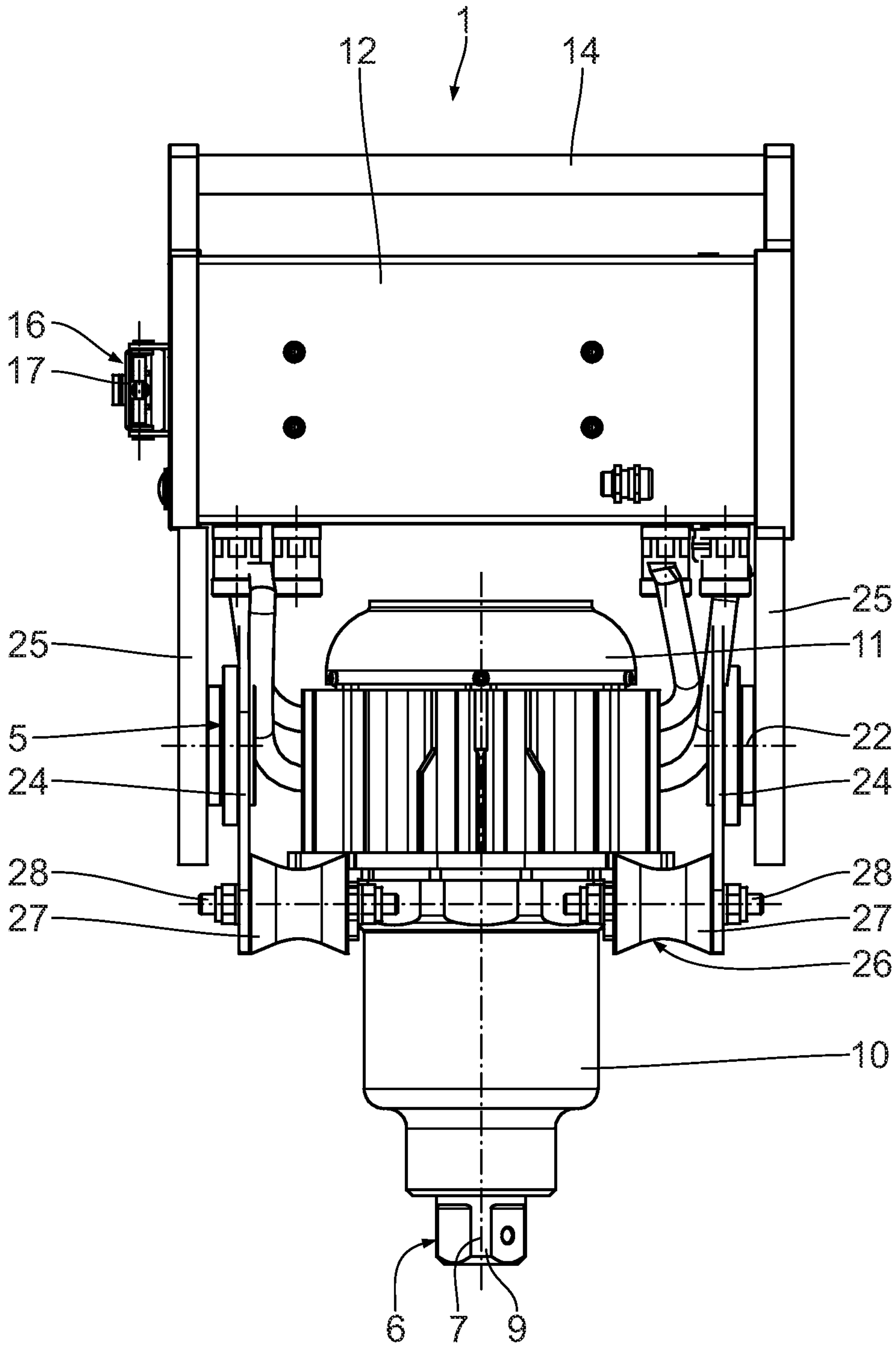
FIG. 4 is a front view of the track processing machine shown in FIG. 1 without the socket wrench.

Referring now to the figures of the drawings in detail and first, particularly to FIGS. 1-7 thereof, there is shown a track processing machine 1, in particular an impact wrench machine for track processing. The track processing machine 1 contains a first structural unit 2 and a second structural unit 3. The first structural unit 2 and the second structural unit 3 are mechanically connected to each other by a linking unit 4. The linking unit 4 has a linking joint 5 for pivoting the second structural unit 3 relative to the first structural unit 2.

The first structural unit 2 has a processing head 6 which can be driven in rotation about an axis of rotation 7. For driving a processing tool 8 in rotation, the processing head 6 has a tool connector 9 in the form of an external square connection. A processing tool 8 construed as a socket wrench is reversibly detachably attached to the tool connector 9.

The processing head 6 is a component of an impact wrench 10 of the track processing machine 1. The impact wrench 10 is rotatably connected to an electric motor 11 of the track processing machine 1. The first structural unit 2 contains the electric motor 11 and the impact wrench 10 with the processing head 6.

The track processing machine 1 has an accumulator receptacle 12. An accumulator 13 is attached to the accumulator receptacle 12 in a reversibly detachable manner. The accumulator 13 is construed as a lithium-polymer accumulator. In particular, the accumulator 13 is construed to supply the electric motor 11 with electrical power.

The track processing machine 1 is construed to be portable and can be manually guided for track processing. For this purpose, the track processing machine 1 has a first handle 14, a second handle 15*a* and a third handle 15*b*. The first handle 14 is fixedly connected to the accumulator receptacle 12. The second handle 15*a* is attached to the accumulator 13. The third handle 15*b* is hingedly attached to the linking unit 4. The third handle 15*b* is a component of the first structural unit 2.

The accumulator 13 is attached to the accumulator receptacle 12 by means of a latching connection 16. The latching connection 16 contains a pivotably mounted latching lever 17 and a latching engagement 18. The latching lever 17 is connected to the accumulator receptacle 12 and is biased by means of a spring element, which is not shown, into a latching position in which the latching connection 16 is closed. In an open position of the latching lever 17, the accumulator 13 can be removed from the accumulator receptacle 12.

A control unit 19 of the track processing machine 1 is connected to the accumulator 13 via the accumulator receptacle 12 in a signal-transmitting, in particular power-transmitting, manner. The control unit 19 is construed to control the electrical power provided by the accumulator 13 and supplied to the electric motor 11. For this purpose, the control unit 19 contains an electronic control element, which is not shown, in particular a programmable controller, and a power component, which is not shown and is in signal connection with the electronic control element, for switching the electrical power supplied to the electric motor 11.

An operating unit 20 of the track processing machine 1 is construed to activate the track processing machine 1 based on a corresponding input from the operator. The control unit 19 and the operating unit 20 are construed to control, in particular regulate, the power transmitted to the electric motor 11 depending on an operator input. The operating unit 20 is in signal connection with the control unit 19 for this purpose.

The second structural unit 3 has the first handle 14, the accumulator receptacle 12, the accumulator 13 with the second handle 15*a*, the control unit 19 and the operating unit 20.

The linking unit 4 connects the first structural unit 2 to the second structural unit 3 such that they can be displaced, in particular pivoted, relative to one another between a first processing position and a second processing position. In both processing positions, the track processing machine 1 can be used for processing a track 21. The linking joint 5 is construed such that the first structural unit 2 and the second structural unit 3 can be fixed in two predetermined linking angles $\alpha 1$, $\alpha 2$ oriented relative to each other. The linking angles $\alpha 1$, $\alpha 2$ are dimensioned around a pivot axis 22 of the linking joint 5, between the axis of rotation 7 and a main extension direction 23 of the second structural unit 3 oriented radially to the pivot axis 22. The first linking angle $\alpha 1$ prevails in the first processing position and is 180°. The second linking angle $\alpha 2$, prevailing in the second processing position, is 90°.

A swivel angle $\Delta\alpha$, by which the first structural unit 2 can be swiveled relative to the second structural unit 3 when shifting between the first processing position and the second processing position, is 90°.

The linking joint 5 has first joint parts 24 and second joint parts 25, the respective first joint part 24 being pivotable relative to the respective second joint part 25. The first joint parts 24 and the second joint parts 25 are components of the linking unit 4. The linking unit 4 is connected to the first structural unit 2 on two sides by means of the first joint parts 24. By means of the second joint parts 25, the linking unit 4 is connected on two sides to the accumulator receptacle 12.

The linking unit 4 has a pivot locking device, not shown, for reversibly releasably fixing the track processing machine 1 in the first processing position or in the second processing position, in particular in each of the predetermined linking angles $\alpha 1$, $\alpha 2$. For this purpose, the pivot locking device comprises a spring bolt which acts in particular between one of the first joint parts 24 and the associated second joint part 25. The pivot locking device is manually displaceable between a locking position and a release position by an operator for displacing the track processing machine 1 between the first and second processing positions.

The control unit 19 is construed to detect whether the linking unit 4, in particular the pivot locking device, is arranged in the locking position. An activation of the electric motor 11 is enabled by means of the control unit 19 only if the linking unit 4 is arranged in the locking position. For this purpose, the control unit 19 can be in signal connection with a switch connected to the pivot locking device.

A vibration decoupler 26 acts between the processing head 6 and the handles 14, 15*a*, 15*b*. Via the vibration decoupler 26, the first structural unit 2 is connected to the linking unit 4, in particular to the first joint parts 24. The electric motor 11 is attached to the first joint parts 24 by means of the vibration decoupler 26. The vibration decoupler 26 contains four damping elements 27 for damping vibration movements between the first structural unit 2 and the linking unit 4. The damping elements 27 are construed as rubber-elastic bodies, in particular with a rotationally symmetrical, in particular hourglass-shaped, form. One screw bolt 28 each fixes a damping element 27 between the first structural unit 2 and the linking unit 4 and limits their vibration movement relative to each other. The vibration decoupler 26 reduces the transmission of vibrations generated at the impact wrench 10 to the linking unit 4 and via the handles 14, 15*a*, 15*b* to the operator.

The track processing machine 1 has a first longitudinal dimension $L_1$ along the axis of rotation 7 in the first processing position and a second longitudinal dimension $L_2$ in the second processing position. The longitudinal dimensions $L_1$, $L_2$ are dimensioned starting from the processing head 6, in particular the tool connector 9, along the axis of rotation 7. The processing tool 8 is not considered in the dimensioning of the longitudinal dimensions $L_1$, $L_2$. The second longitudinal dimension $L_2$ is, for example, approximately 37% smaller than the first longitudinal dimension $L_1$.

The track processing machine 1 is construed, in particular the electric motor 11 and the impact wrench 10 are construed, to provide a drive torque M about the axis of rotation 7 of 500 Nm at the processing head 6, in particular at the processing tool 8.

The mode of operation of the track processing machine 1 is as follows.

The track processing machine 1 is initially deactivated. The accumulator 13 is charged and attached to the accumulator receptacle 12. The processing tool 8 is attached to the tool connector 9. The processing machine 1 is in the first processing position, in which the axis of rotation 7 is oriented substantially parallel to the main extension direction 23 of the second structural unit 3.

The processing machine 1 can be used for tightening and/or loosening various track screw connections 29. Track screw connections 29 with a vertical screw axis 30 are used, for example, for fastening rails 31 to track sleepers 32. Track screw connections 29 with a horizontal screw axis 30 are used, for example, on emergency lug connectors 33.

In FIG. 1 to FIG. 4, the track processing machine 1 is shown in the first processing position. For actuating the track screw connections 29 with the vertical screw axis 30, the processing machine 1 is arranged in the first processing position. Due to its large longitudinal dimension $L_1$ in the vertical direction, the track processing machine 1 can be easily gripped and guided by the operator and, due to its small transverse dimensions in the horizontal direction, it can be used in a particularly space-saving manner.

By means of the operating unit 20, an operator command is transmitted to the control unit 19 for activating the track processing machine 1. On the basis of a further operator command detected via the operating unit 20, the control unit 19 regulates the electrical power provided at the electric motor 11. By means of the control unit 19, the electrical power is switched from the accumulator 13 to the electric motor via the power component. The track screw connection 29 is either tightened or loosened in accordance with the direction of rotation about the axis of rotation 7 specified by the operator.

In order to actuate the track screw connections 29 of the emergency lug connector 33 with the respective horizontal screw axis 30, the track processing machine 1 is shifted from the first processing position to the second processing position. For this purpose, the pivot locking device is loosened manually by the operator, in particular the spring bolt is displaced from a locking position to a release position. The second structural unit 3 can be swiveled manually relative to the first structural unit 2 by a swivel angle $\Delta\alpha$ of 90°. The location of the pivot locking device in the release position is detected by the control unit 19. The operation of the track processing machine 1, in particular a power transfer between the accumulator 13 and the electric motor 11, is prevented by the control unit 19.

In the second processing position, the pivot locking device returns to the locking position, in particular the spring bolt engages in a corresponding bore for fixing the linking unit 4 in the second processing position. The control unit 19 detects the arrangement of the pivot locking device in the locking position and allows the track processing machine 1 to be activated.

Figure 5:
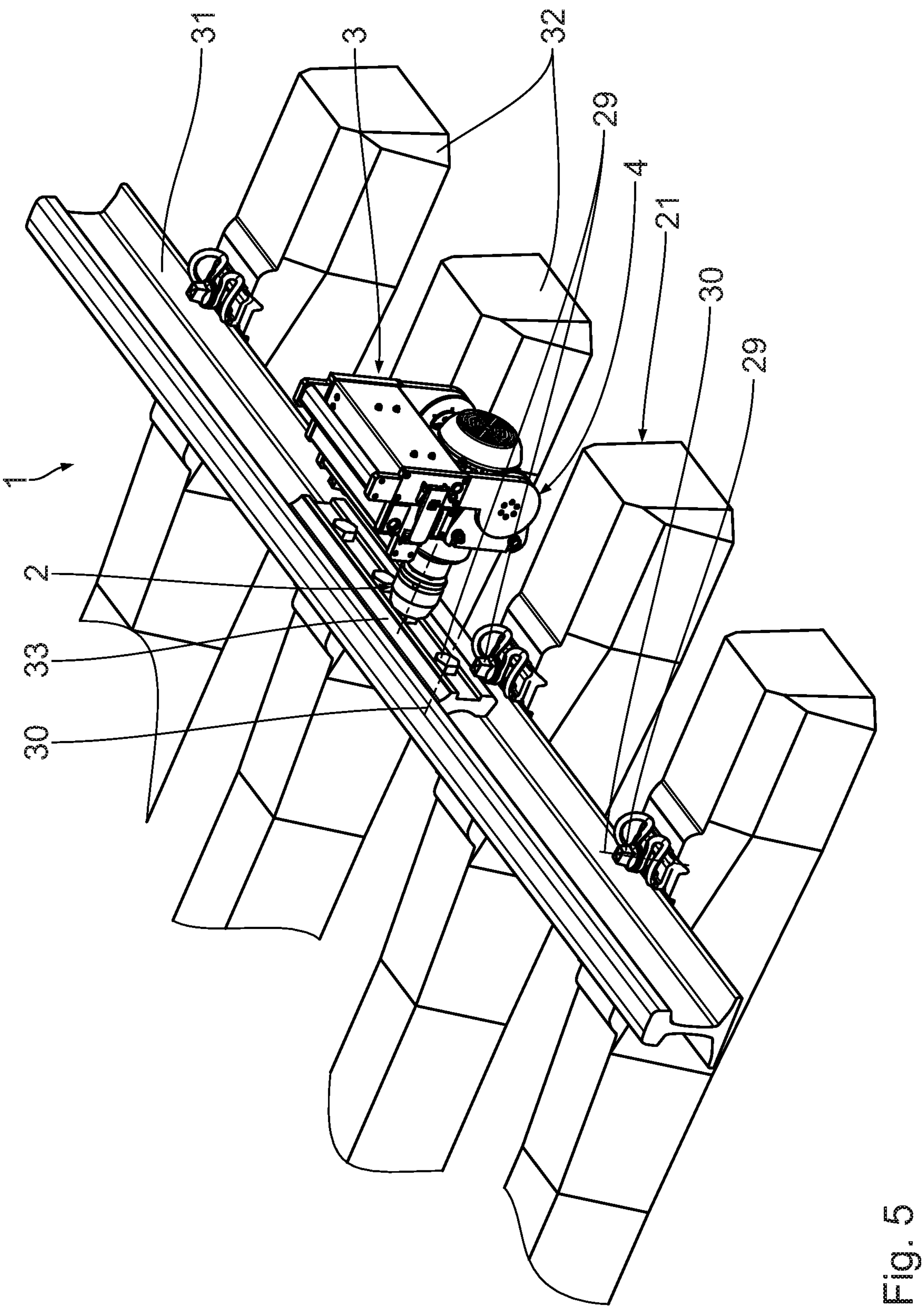
FIG. 5 is a perspective view of the track processing machine shown in FIG. 1, wherein the track processing machine is arranged in a second processing position in which the second structural unit is pivoted about the first structural unit by use of the linking unit.
Figure 6:
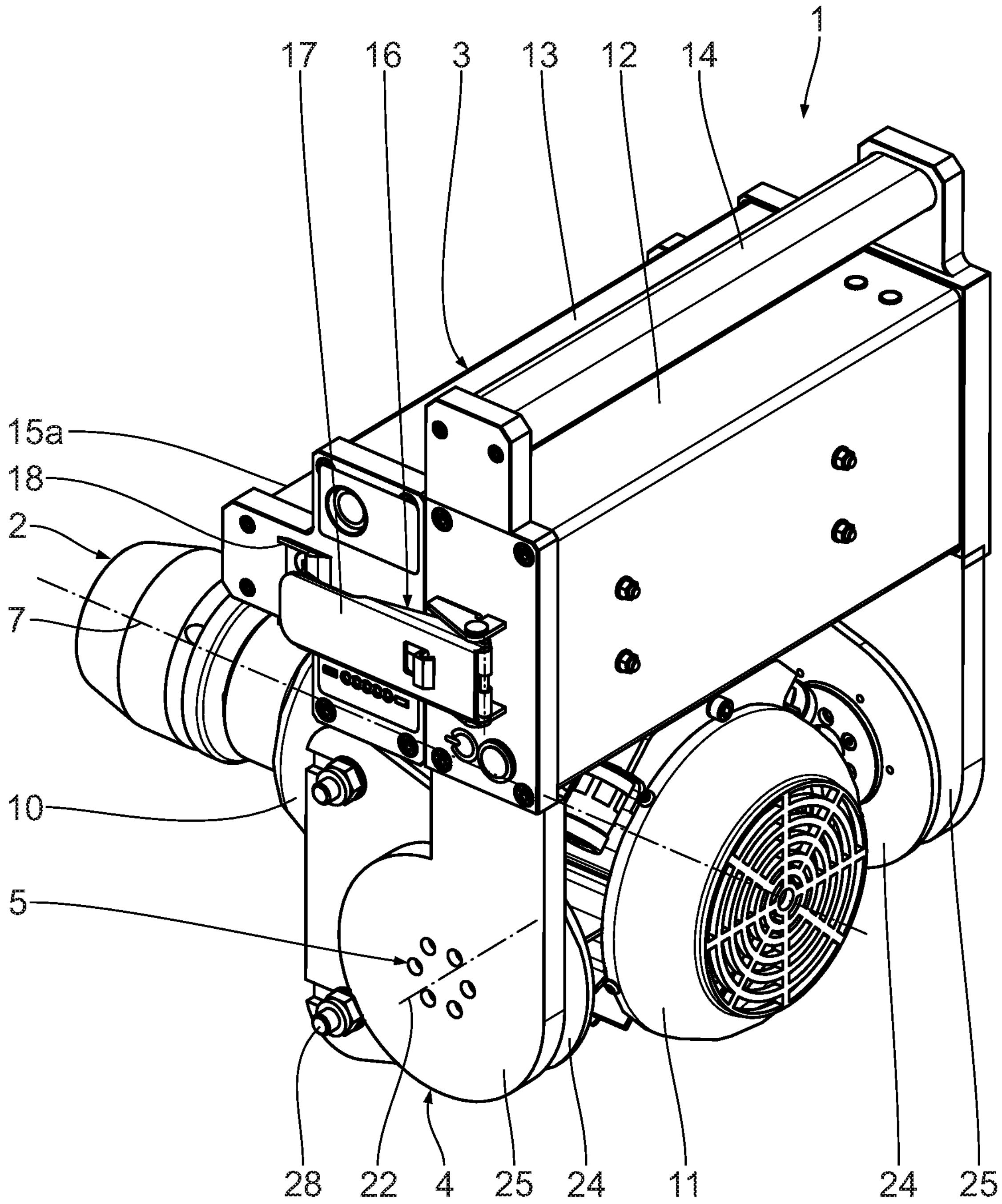
FIG. 6 is a perspective view of the track processing machine shown in FIG. 5.
Figure 7:
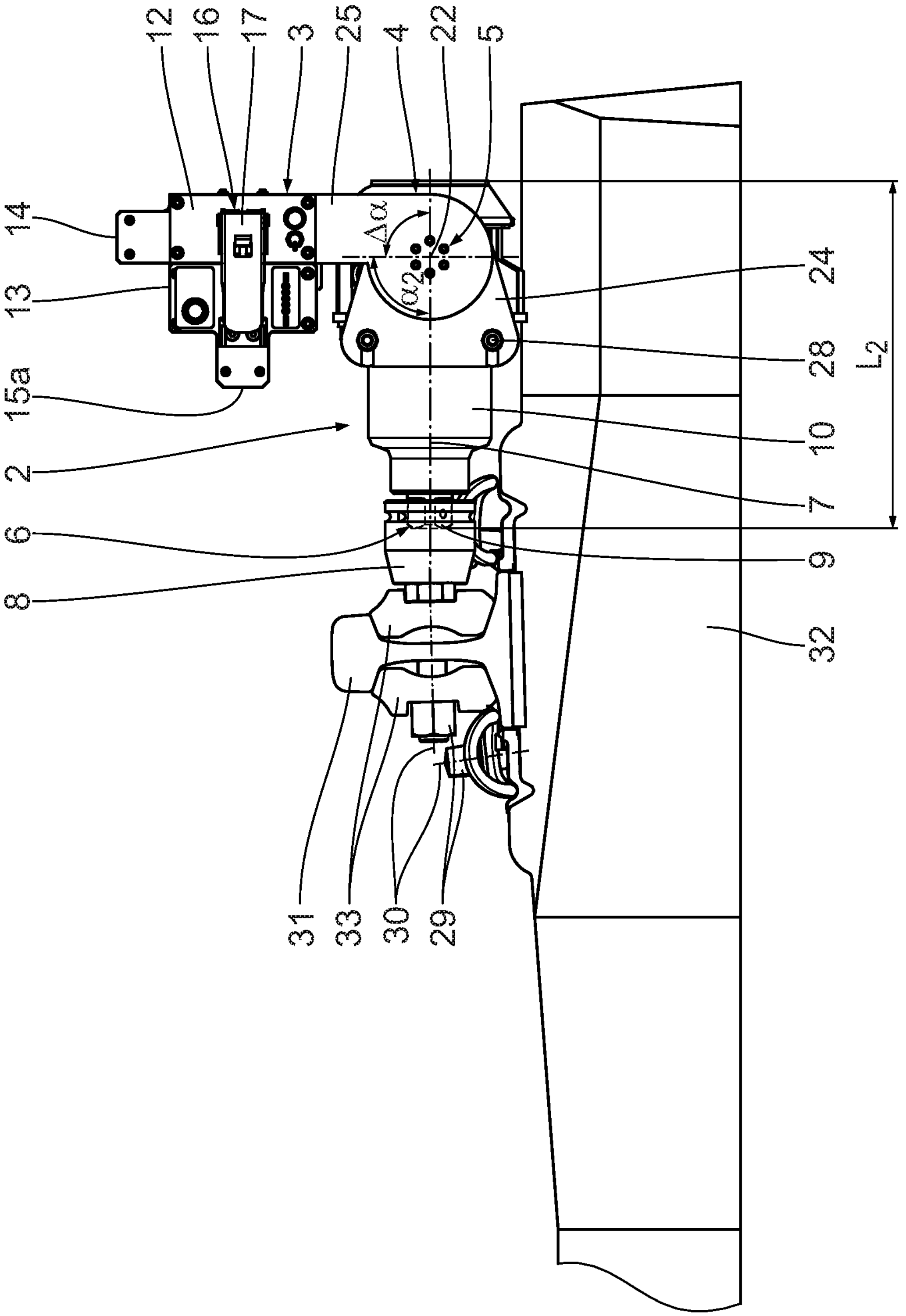
FIG. 7 is a side view of the track processing machine shown in FIG. 5, in particular when loosening a screw connection with the screw axis oriented horizontally.

In FIG. 5 to FIG. 7, the track processing machine 1 is shown in the second processing position. The track processing machine 1 or the processing tool 8 can be moved by the operator to one of the track screw connections 29 with the horizontal screw axis 30 by means of the handles 14, 15*a*, 15*b* and engaged with the latter. Due to the reduced longitudinal dimension $L_2$, the installation space requirement of the track processing machine 1 in the horizontal direction is particularly small. Due to the fact that the second structural unit 3 is pivoted upwardly about the pivot axis 22 by means of the handles 14, 15*a*, the latter maintains its orientation with respect to the vertical axis, and the track processing machine 1 is particularly easy to handle.

The mode of operation of the track processing machine 1 in the second processing position corresponds to the mode of operation of the track processing machine 1 in the first processing position.

The arrangement of the vibration decoupler 26 between the processing head 6 and the handles 14, 15*a*, 15*b*, ensures that the intensity of the vibrations acting on the operator is reduced. Due to the fact that the vibration decoupler 26 is arranged between the first structural unit 2 and the linking unit 4, the vibration stress on the linking unit 4 is also reduced. Furthermore, the stress on sensitive electronic components such as the accumulator 13 and the control unit 19, which are part of the second structural unit 3, is reduced.

Due to the arrangement of the entire drive train, in particular the electric motor 11 and the impact wrench 10, on the vibration side of the vibration decoupler 26, a constructively complex and wear-prone vibration decoupling across a drive shaft can be dispensed with. The arrangement of the mass-intensive accumulator 13 on the operator side of the vibration decoupler 26 provides additional vibration damping due to mass inertia.

Due to the fact that the impact wrench 10 is provided for driving the processing head 6 in rotation, the housing torques to be borne by the operator are significantly reduced. The track processing machine 1 is particularly operator-friendly in use.

The invention claimed is:

1. A track processing machine for track processing, comprising:

at least one handle for manually guiding the track processing machine;

a first structural unit with a processing head being drivable in rotation about an axis of rotation;

a second structural unit; and a linking unit for mechanically connecting said first structural unit to said second structural unit and for reducing a longitudinal dimension of the track processing machine along the axis of rotation, said linking unit having a linking joint for pivoting said first structural unit relative to said second structural unit, said first structural unit being pivotable relative to said second structural unit by at least 70° between a first processing position for track processing with said axis of rotation in a substantially vertical position and a second processing position for track processing with said axis of rotation in a substantially horizontal position.

2. The track processing machine according to claim 1, wherein the track processing machine is an impact wrench machine.

3. The track processing machine according to claim 1, wherein said linking unit connects said first structural unit with said second structural unit such that these are displaceable relative to each other between the first processing position and the second processing position.

4. The track processing machine according to claim 1, wherein said linking unit is construed for tool-free displacement of said first structural unit relative to said second structural unit.

5. The track processing machine according to claim 1, further comprising an impact wrench for driving said processing head in rotation about the axis of rotation.

6. The track processing machine according to claim 5, wherein said processing head providing a drive torque about the axis of rotation of at least 150 Nm.

7. The track processing machine according to claim 5, wherein said first structural unit has a motor for rotatably driving said processing head.

8. The track processing machine according to claim 5, further comprising an energy storage device for providing a drive power transmitted to said processing head.

9. The track processing machine according to claim 8, wherein said energy storage device has an accumulator.

10. The track processing machine according to claim 8, wherein said second structural unit contains said energy storage device.

11. The track processing machine according to claim 5, further comprising a controller to control a drive power transmitted to said processing head.

12. The track processing machine according to claim 11, wherein said controller is construed to detect a configuration of the track processing machine in at least one processing position.

13. The track processing machine according to claim 5, further comprising a vibration decoupler acting between said processing head and said at least one handle.

14. A process for track processing, which comprises the steps of:

providing a track processing machine according to claim 1; and performing the track processing via the track processing machine.

15. The track processing machine according to claim 1, wherein the track processing machine has a first longitudinal dimension along the axis of rotation in the first processing position and a second longitudinal dimension in the second processing position, wherein the second longitudinal dimension is smaller than the first longitudinal dimension by at least 25%.

16. A track processing machine for track processing, comprising:

at least one handle for manually guiding the track processing machine;

a first structural unit with a processing head being drivable in rotation about an axis of rotation;

a second structural unit; and a linking unit for mechanically connecting said first structural unit to said second structural unit and for reducing a longitudinal dimension of the track processing machine along the axis of rotation; and the track processing machine having a first longitudinal dimension along the axis of rotation in a first processing position for track processing with said axis of rotation in a substantially vertical position and a second longitudinal dimension in a second processing position for track processing with said axis of rotation in a substantially horizontal position, the second longitudinal dimension being smaller than the first longitudinal dimension by at least 25%.

* * * * *